Sept. 23, 1969　　J. W. ARMSTRONG ET AL　　3,468,404
CLUTCH WITH CABLE OPERATOR
Filed Sept. 11, 1967
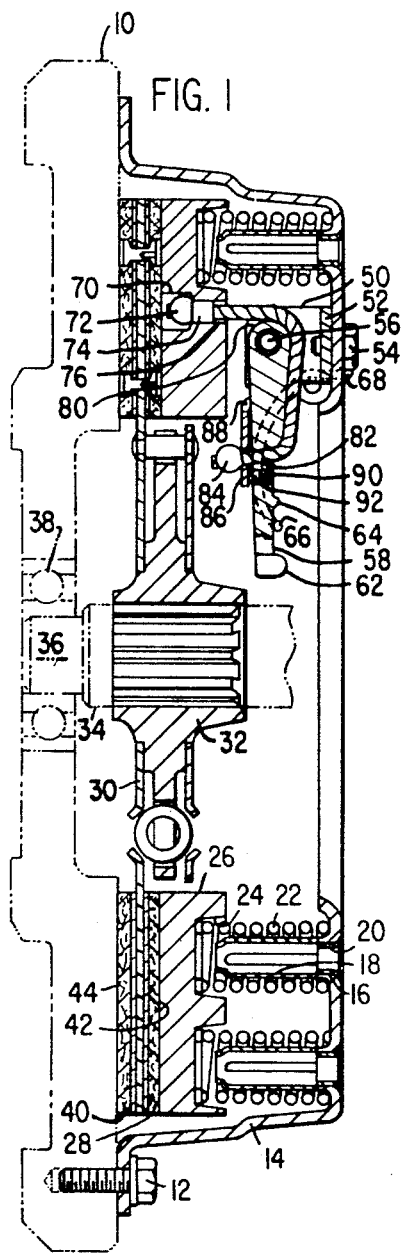
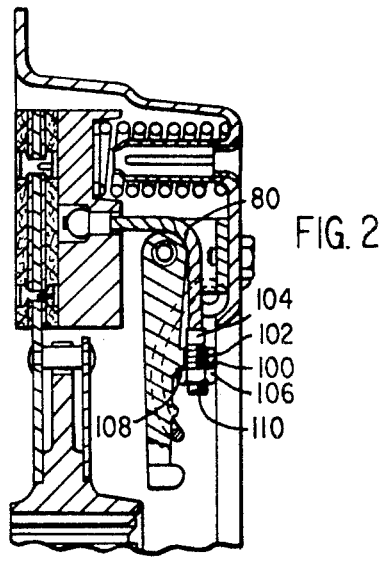
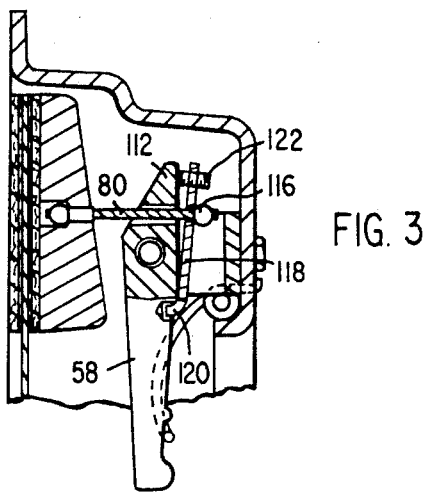
INVENTORS.
JACK W. ARMSTRONG
DAVID L. MOORE.
FREDERICK C. SCHMIDT.
BY John R. Varney
ATTORNEY.

United States Patent Office 3,468,404
Patented Sept. 23, 1969

3,468,404
CLUTCH WITH CABLE OPERATOR
Jack W. Armstrong, Baldwinsville, David L. Moore, DeWitt, and Frederick C. Schmidt, Syracuse, N.Y., assignors to Lipe-Rollway Corporation, Syracuse, N.Y., a corporation of New York
Filed Sept. 11, 1967, Ser. No. 666,885
Int. Cl. F16d 23/12, 13/38
U.S. Cl. 192—99                                            1 Claim

ABSTRACT OF THE DISCLOSURE

A clutch release mechanism wherein flexible means connect the clutch release levers to the clutch pressure plate to effect movement of the pressure plate upon movement of the clutch release levers to disengage the driving connection through the clutch.

BACKGROUND OF INVENTION

In such clutches one or more friction discs serve to effect the driving engagement between the driving member, normally connected to the engine fly wheel and the driven member, normally an output shaft. Spring means are normally used to urge the friction disc which is splined to the output shaft into engagement with the driving member by urging a pressure plate toward the driving member to engage the friction disc therebetween. In order to effect release of the clutch, clutch release levers are carried by a cover member which surrounds and encloses the friction discs and the pressure plate. Heretofore in clutches of this general type, the pressure plates have been provided with ears or lugs to connect the release levers to the pressure plate. In addition, the plate is provided with knobs of upstanding protuberances to provide spring locating and receiving means. This type of design for the pressure plate gives the plate added mass and weight which in turn reduces its centrifugal burst resistance.

SUMMARY OF INVENTION

Accordingly, it is an object of the invention to provide a new and improved clutch release mechanism which is more economical to manufacture and which results in a clutch having a higher burst strength capacity.

The invention consists in the novel features and constructions hereafter set forth and claimed.

BRIEF DESCRIPTION OF DRAWINGS

In describing the invention reference is had to the accompanying drawings in which like characters designate corresponding parts in all the views.

In the drawings—

FIGURE 1 is a cross sectional elevational view of a clutch showing one embodiment of the invention.

FIGURE 2 is a fragmentary cross sectional view showing a second form of the invention.

FIGURE 3 is a cross sectional fragmentary elevational view of a third form of the invention.

DESCRIPTION OF PREFERRED EMBODIMENT

In FIGURE 1 the driving member is shown in phantom lines and indicated at 10 and may comprise, for example, the fly wheel of an automotive engine. Surrounding the driving member 10 and affixed thereto as by a bolt at 12 is a cover member 14 which may be fabricated from a high tensile strength material. The cover member 14 is provided with a plurality of apertures 16 in which are received fluted spring mounting members 18 which have a portion 20 extending through the aperture 16 and are upset in any suitable manner to permanently affix the members 18 to the underside of the cover 14. Mounted on the members 18 are high compression springs 22 which are received in apertures or indentations 24 formed in a pressure plate 26. The pressure plate may be a cast iron material. The springs 22 normally urge the pressure plate 26 into engagement with the friction facing 28 carried on one side of a friction disc 30 affixed to the splined hub 32 which in turn is splined to a driven shaft, a portion of which is shown in phantom lines at 34. The end of the shaft 34 is reduced as at 36 and is received in a pilot bearing 38 carried in a central aperture formed in the member 10.

The opposite face of the disc 30 is also provided with a friction facing 40 and the friction faces 28 and 40 are clamped between the friction face 42 formed on the pressure plate 26 and the friction face 44 formed on the driving member 10 in order to provide a driving engagement between the driving member 10 and the driven shaft 34, the compression springs 22 providing the yieldable force to normally effect this engagement.

As best seen in the upper portion of FIGURE 1, a plurality of yoke members 50 having a pair of legs and a bight portion 52 are carried on the underside of the cover 14 by a pair of bolts 54. Pivotally mounted in, by means of a needle bearing 56, and carried by the legs of the yoke member 50 is a clutch release lever 58. The clutch release lever is formed at its inner end and with a circumferential extending, groove 60, having purpose to be hereafter described, and the outer end of the release lever is formed with a release bearing engaging pad 62. The lever 58 is normally maintained in the position shown in FIGURE 1 by a U-shaped tension spring which is received between the pad 62 and a knob 64 and the spring passes through the cover 14 portions of the spring being shown at 66 and 68.

The pressure plate 26 is formed with a plurality of apertures 70 in which a ball 72 is received. The ball 72 is formed with a sleeve portion 74 which is received in a counter sunk portion 76 of the aperture 70 and a flexible cable which may be galvanized steel rope or a high fatigue resistant rod, specially lubricated, or any other suitable flexible material, is permanently affixed at one end in the sleeve 74 and ball 72. The cable or fatigue resistant rod 80 is entrained in the groove 60 formed in the inner end of the lever and passes thereover and through an aperture 82 formed in the midportion of the lever 58. The opposite end of the cable 80 is also received in and permanently affixed to a ball 84 and intermediate the ball 84 and the underside of the lever 58 is a plate member 86 having a tongue 88 formed thereon being received in a slot formed in the underside of the lever 58. The opposite end of the tongue 86 is engaged by a set screw 90 located in a tapped aperture 92 formed in the lever 58 intermediate the aperture 82 and the ridge 64.

As will be obvious when the pad 62 of the release levers are engaged by the release bearing (not shown) which is journaled on the driven shift in the conventional manner and is moved to the left as in FIGURE 1, the levers are moved clockwise about the bearing 56 and the pressure plate is moved to the right away from the friction disc through the agency of the cable 80 in order to disengage the driving connection between the driver 10 and the driven shaft 34.

As wear takes place on the friction facing material 40 and 28 the distance between the pressure plate 26 and the lever 58 may be adjusted by the set screw 90 and the plate 86 which, as will be obvious, is adjusted by the rotating of the set screw 90 to move the plate and in turn move the ball 84 toward or away from the underside of the release lever 58.

In the preferred embodiment of the invention as shown in FIGURE 2, the construction of the clutch and release lever is virtually the same except as best seen in that figure the release lever is formed with an upstanding ear 100 which is apertured as at 102 to receive a threaded sleeve 104. The threaded sleeve 104 is affixed in any suitable manner to the flexible cable 80 and the tension on the cable 80 may be varied by rotating the nut 106 against the outer face 108 of the ear 100 on the threaded portion 110 of the sleeve 104.

In the modification shown in FIGURE 3, the cable 80 passes through the inner end of the release lever 58 which is formed with a nose 112 which is apertured as at 114 to allow the cable 80 to pass therethrough. A ball 116 is permanently affixed to the outer end of the cable 80 and engages a plate member 118 which has a tongue 120 received in aperture formed in the upper surface of the release lever 58. A set screw 122 passes through a threaded aperture formed in the tongue 118 and engages the nose portion 112 of the lever in order to adjust the tension on the cable 80.

It will be obvious that the invention in any of its modified forms gives substantial and important advantages to a clutch manufactured in accordance with the invention.

Primarily, the spring locating knobs have been replaced by the spring locating indentations and release lever mounting lugs have been eliminated thus reducing the weight of the plate which provides a higher burst capacity. In addition, the improved release mechanism reduces the cost of the manufacture of the clutch as two bearings have been eliminated from the release lever assembly and the machining of the ears or lugs formerly used to mount the assembly has also been eliminated.

Finally, by virtue of the elimination of the bearings less force is needed to release the clutch which is also due to the fact that there is no misalignment possible because of the flexible release assembly.

What we claim is:

1. A clutch comprising a driving member, a driven member, friction means selectively operable to connect said members in driving engagement, including a pressure plate, yieldable means for normally urging said pressure plate toward said friction means, a cover member enclosing said pressure plate, one or more release members pivotally mounted on said cover member, flexible cable means connecting said pressure plate to said levers to effect movement of said pressure plate away from said friction means upon pivotal movement of said levers to effect dis-engagement of the driving connection between said driving and driven members.

References Cited

UNITED STATES PATENTS

| | | | |
|---|---|---|---|
| 2,016,451 | 10/1935 | Nutt et al. | 192—70.3 |
| 2,300,187 | 10/1942 | Wemp | 192—70.29 |
| 3,392,812 | 7/1968 | Kaptur et al. | 192—99 |
| 2,601,912 | 7/1952 | Reed | 192—99 |

BENJAMIN W. WYCHE III, Primary Examiner

U.S. Cl. X.R.

192—70.3